Figure 1:
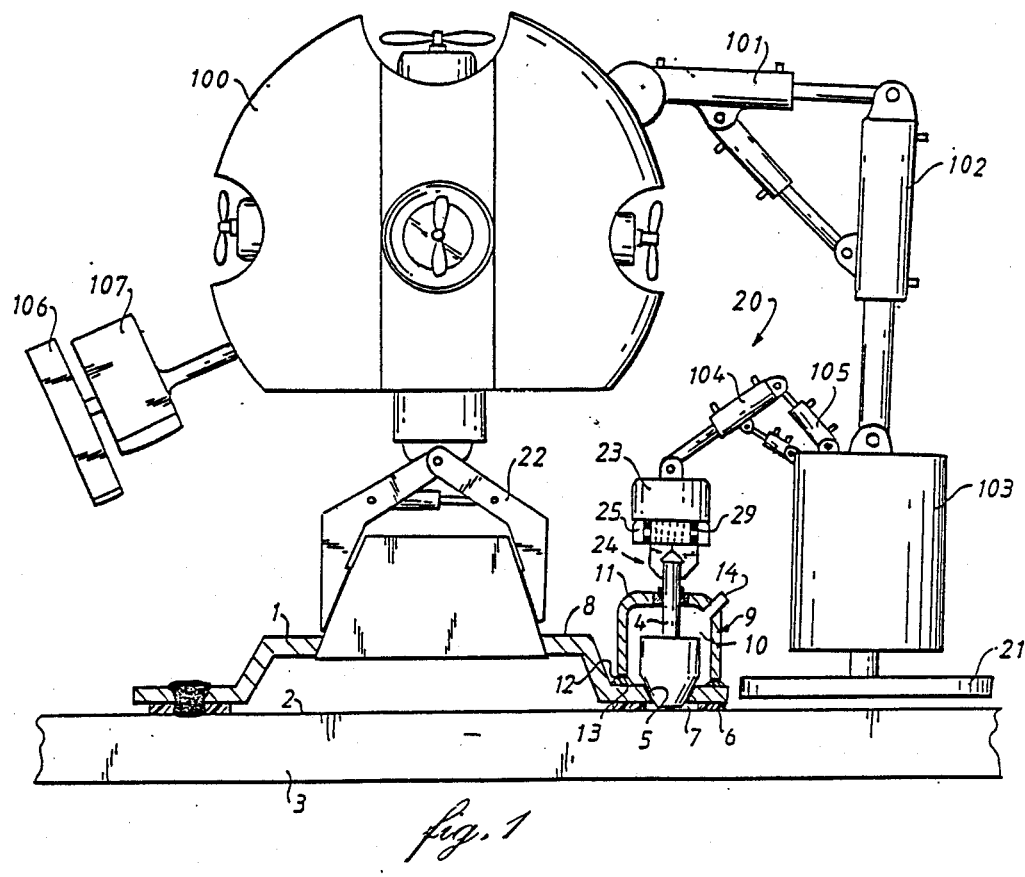

United States Patent [19]

Niinivaara et al.

[11] Patent Number: 4,835,355
[45] Date of Patent: May 30, 1989

[54] METHOD, APPARATUS AND ELEMENT FOR ACCOMPLISHING AN UNDERWATER WELD JOINT

[76] Inventors: Juhani Niinivaara, SF-45610 Koria; Hannu Makelainen, Evakkotie 75 L 6, SF-96100 Rovaniemi, both of Finland

[21] Appl. No.: 858,184

[22] PCT Filed: Aug. 14, 1985

[86] PCT No.: PCT/FI85/00068
§ 371 Date: Jun. 16, 1986
§ 102(e) Date: Jun. 16, 1986

[87] PCT Pub. No.: WO86/01137
PCT Pub. Date: Feb. 27, 1986

[30] Foreign Application Priority Data

Aug. 14, 1984 [FI] Finland .................................. 843199

[51] Int. Cl.4 .............................................. B23K 9/16
[52] U.S. Cl. ........................................ 219/72; 219/74
[58] Field of Search ..................... 219/72, 137 R, 136, 219/74

[56] References Cited

U.S. PATENT DOCUMENTS

| 4,035,602 | 7/1977 | Berghof | 219/72 |
| 4,069,408 | 1/1978 | Masubuchi et al. | 219/72 |
| 4,130,751 | 12/1978 | Gordon | 219/99 X |
| 4,172,974 | 10/1979 | Stingelin et al. | 219/72 |

FOREIGN PATENT DOCUMENTS

| 182810 | 6/1966 | U.S.S.R. | 219/72 |
| 2136721 | 9/1984 | United Kingdom | 219/72 |

Primary Examiner—E. A. Goldberg
Assistant Examiner—Lincoln Donovan
Attorney, Agent, or Firm—Webb, Burden, Ziesenheim & Webb

[57] ABSTRACT

A method and apparatus for accomplishing an underwater weld joint with a welding electrode between a support and an element to be welded fast onto the support in which the element to be welded fast is insulated from the ambient water with a protection cover which is disposed tightly against the free surface of the element to be welded fast and through the wall of which cover the welding electrode rotating about its longitudinal axis extends is led during the welding operation against the edges of an opening in the element to be welded fast, towards the support.

9 Claims, 2 Drawing Sheets

U.S. Patent    May 30, 1989    Sheet 1 of 2    4,835,355

METHOD, APPARATUS AND ELEMENT FOR ACCOMPLISHING AN UNDERWATER WELD JOINT

The invention relates to a method and apparatus for accomplishing an underwater weld joint, preferably for fixing anodes controlling the corrosion of the underwater parts on offshore constructions, in which method the surface of the support to which the element to be welded is to be fastened is first cleaned, after which the welding apparatus is secured to the support for the welding operation. The apparatus comprises cleaning and fastening means for cleaning that surface of the support to which the element is to be welded and for securing the apparatus to the support. The invention also relates to an element to be welded for use with said method and apparatus.

Underwater welding operations have increased intensely owing to the fact that various off-shore constructions have become more common and especially that marine drilling for oil has increased. One of the most significant problems with such off-shore constructions is the attack of corrosion, which, if uncontrolled, will destroy the construction to be useless in a very short time. Attempts have been made to solve this problem, even with good success, by fixing corrosion-controlling anodes onto to the underwater parts. Thereby a new problem has presented itself, the replacement of the corroded anodes with new ones, since underwater welding is very expensive and difficult to carry out.

Known in the art is so-called habitat-chamber welding method used in underwater repair operations which method has also beem used for fixing said corrosion-controlling anodes. This known method is based on supporting the object to be repaired or the corrosion-controlling anode to be fixed into a special chamber wherein the diver carries out the necessary welding operations. Althought said habitat-chamber welding method strives at fulfilling the quality requirements set for the welding by different classification societies, it has the disadvantage of being very expensive both in running cost and in investment, since it employs a large and complicated construction and additionally always requires a diver to be present. Owing to the expensiveness of the habitat-chamber welding method efforts have already long been made to develop wet welding methods wherewith the quality requirements set by the classification societies could be fulfilled. The greatest hindrance to the success of these wet welding methods has been the hardening of the steel in the underwater parts, whereby so-called hydrogen-cracks are formed which may grow with time and break the steel. For this reason, e.g. Det Norske Veritas has prohibited all welding methods not fulfilling the very high requirements for the welding quality set by this classification society.

The object of the present invention is to improve, accelerate and facilitate underwater welding as well as to eliminate the disadvantages and weaknesses of all the previously known underwater welding methods.

These objects have been achieved, according to the method of invention, in such a manner that the element to be welded is brought onto the cleaned support, that the junction of the support and the element to be welded is insulated from the ambient mass of water and that during the welding operation the welding electrode is pressed against the edges of an opening extending through the element to be welded, towards the support.

The apparatus with which this method is carried out is characterized by placing means for bringing the element to be welded to its fastening point on the cleaned support, at least one protecting cover disposed in tight relationship on the free surface of the element to be welded fast at least for the duration of the welding operation, through the wall of the cover at least one welding electrode sealed with respect to said wall extends, the cover insulates the junction between the element to be welded fast and the support from the ambient mass of water, and a drive means for conducting welding current to the welding electrode and for pressing said welding electrode against the edges of the opening in the element during the welding operation.

The element to be welded fast by the method of the invention and with the apparatus of the invetion is characterized by having at least one opening for the welding electrode, extending through said element in the direction substantially perpendicular to the support.

The primary advantage of the invention is that the apparatus is small-sized and is of a far simpler construction and considerably cheaper than the apparatus used with the earlier known habitat-chamber welding method. A further advantage of the invention is that it can be used totally without a diver: the present invention may be used for a previously undetermined period. Owing to the small size, simple construction and faster set-up, significant savings are thus obtained both in investment and running costs.

Figure 2:
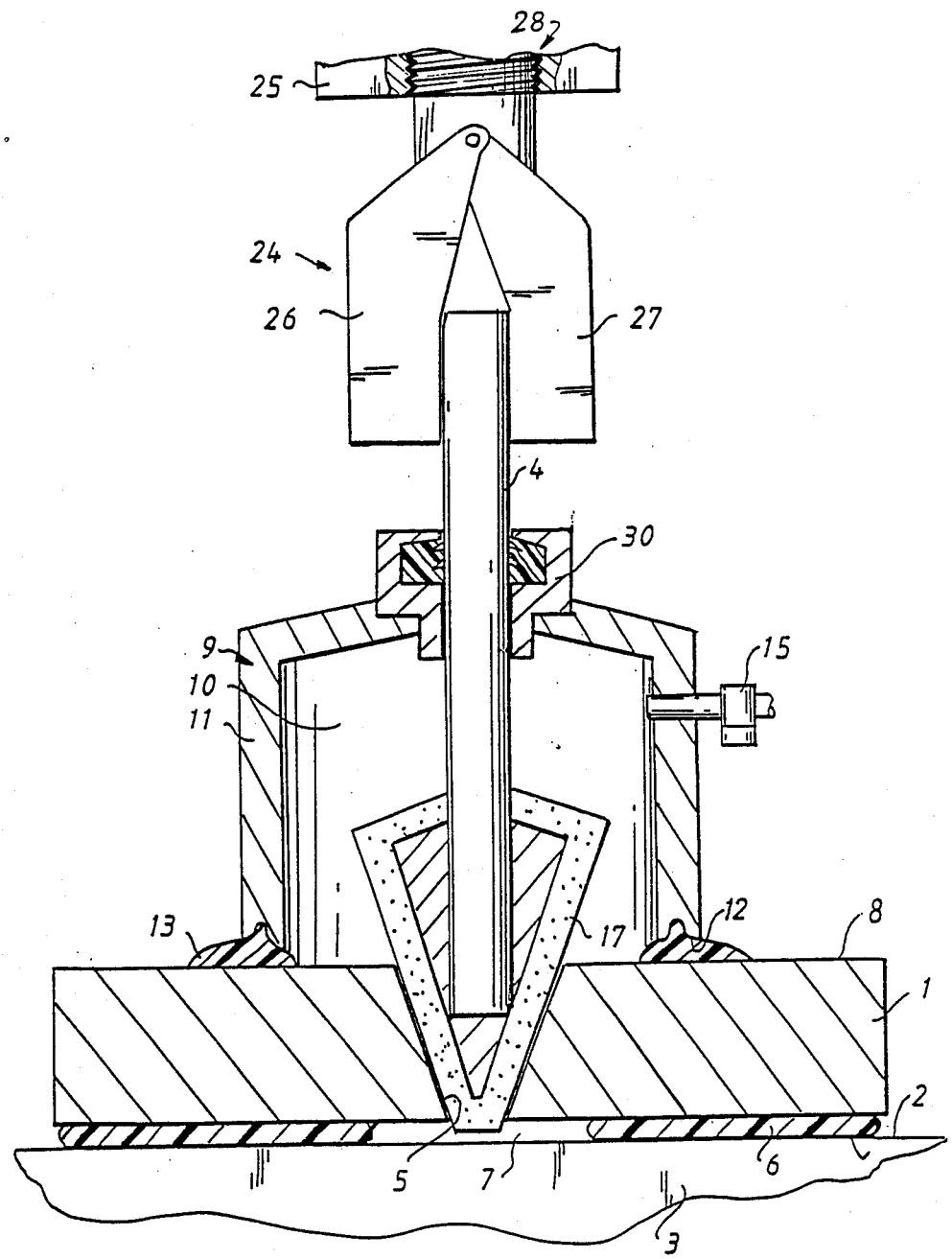

The following is a more detailed description of the invention by means of preferred empodiments with reference to the accompanying drawings, wherein FIG. 1 shows the welding apparatus according to the invention in a partial cross-section, said apparatus being secured to an unmanned diving apparatus, and FIG. 2 shows a partially cross-cut side view of the welding apparatus according to a preferred empodiment of the invention.

In the example shown in FIG. 1, the welding apparatus 20 according to the invention has been secured to a remotely-controlled unmanned diving apparatus 100 with which the welding apparatus is moved in the water from one welding spot to another. First, the surface of the support 3, said support being in this exemplary case an underwater leg of an oil rig, against which the element 1, which in this exemplary case is a corrosion-controlling anode, is to be welded fast is cleaned. After cleaning the welding apparatus is secured to the object to be welded. For carrying out these operations, the welding apparatus 20 has cleaning and fastening means 21 articulated to the remotely-controlled diving apparatus 100 by means of hydraulically movable lever arms 101 and 102. In this preferred example, the cleaning and fastening means consists of discs 21 preferably of rubber-based material and rotated by a hydraulic motor 103, said discs grinding the surface 2 to be under the element 1 to be fully clean and generating, when rotating near the surface 2 of the support 3, a powerful subatmospheric pressure, whereby the welding apparatus 20 is firmly secured in place due to the suction effect produced by the subatmospheric pressure.

After the securing of the welding apparatus 20 in place, the element 1 to be welded fast is brought onto the support 3, and the junction between the support 3 and the element 1 to be welded fast is insulated from the ambient mass of water. For bringing the element 1 to welded fast in place, the welding apparatus 20 comprises placing means 22, which in this exemplary case shown in FIG. 1 consist of hydraulically movable shears 22 fastened to diving apparatus. For insulating the junction to be welded, the welding apparatus 20 comprises a cup-like protecting cover 9 which can be transported by means of hydraulically movable lever arms 104, 105, said protecting cover being pressed tightly about the junction to be welded, against the free top surface 8 of the element 1 to be welded fast.

To achieve good sealing, the head edge 12 of the protecting cover 9 which is to abut the element 1 to be welded fast is provided with a gasket 13.

Alternatively the protecting cover 9 may be fastened beforehand, e.g. by welding, onto the surface of the element 1 to be welded fast to surround the junction to be welded.

For secure and fully sealed insulation of the junction to be welded from the ambient mass of water, a spacer ring 6 of suitable elastic material, preferably rubber, is disposed between the element 1 to be welded fast and the support 3 to form an insulated interspace 7. To facilitate the fitting, the spacer ring 6 has been fastened in advance, e.g. by glueing to the surface of the element 1 to be welded fast which is to abut the support 3.

An opening 5 for the welding electrode 4 has been made by boring in the element 1 at the junction to be welded, said opening extending substantially perpendicularly to the surface 2 in the support 3.

As can be seen from FIGS. 1 and 2, the welding electrode 4 has been arranged to protrude in a sealed manner through the wall of the protecting cover 9, whereby the drive means 23 rotating the welding electrode 4 and pressing it downwards has been fastened to that part of the welding electrode 4 which protrudes from the protecting cover 9. In this exemplary case, the drive means comprises gripping means 24 consisting of hydraulically movable jaws 26,27 and being fixed to that part of the welding electrode 4 which protrudes from the protecting cover 9, as well as rotating means 25, which is preferably a hydraulic motor and which is connected in a non-rotating manner to hydraulically movable jaws 26,27 and which is furnished with a screw feeder 28 for the welding electrode, said screw feeder feeding the welding electrode forward at a speed substantially corresponding to the speed of consumption of the welding electrode, as well as with current-conducting carbons 29 for conducting the welding current to the welding electrode.

As can be seen from the FIGS. 1 and 2, that part of the welding electrode 4 which lies within the interior of the protecting cover 9 as well as the opening 5 for the welding electrode 4 have been formed to match one another, to taper conically downwards towards to the support 3. Owing to this kind of shaping as well as rotating movement of the welding electrode 4, all welding slag will be pushed upwards into the protecting cover 9, and no slag inclusions weakening the weld joint will be formed.

To achieve a high-standard welding result, the interior 10 of the protecting cover must be free from water prior to the commencing of the welding operation. To fulfil this requirement, according to one embodiment of the invention the wall 11 of the protecting cover 9 is provided with an outflow member 14 connected preferably either to a vacuum source or a suction device. By means of the outflow member 14, the interior 10 of the protecting cover 9 can be evacuated of water and also of the welding gases formed during welding operation. According to an alternative embodiment, a suitable filler, such as gas, polyurethane foam or welding flux, may be injected into the interior 10 of the protecting cover 9 to be pressed in place, either through the open head edge 12 or through an outflow member, preferably a pressure valve 15, disposed in the wall 11 of the protecting cover 9 and opening at a predetermined pressure, to evacuate water from said interior prior to the commencing of the welding operation. In the latter case, the outflow member 14 is also used to evacuate gases formed in connection with the welding operation from the interior of the protecting cover 9. When the protecting cover 9 has been fastened in advance permanently to the element 1 to be welded fast, the penetration of water into the interior 10 of the protecting cover 9 can be prevented most simply by having the opening in the element 1 to be welded fast covered with a suitable covering material, e.g. molten resin. According to the preferred embodiment of the invention, the protecting resin has been applied to the element 1 to that surface of the spacer ring 6, fitted coaxially with the opening 5, which is to abut the support 3. Also in this exemplary case, the wall 11 of the protecting cover 9 is provided with an pressure valve 15 of the type shown in FIG. 2 for the evacuation of the welding gases during the welding operation.

As can be seen from FIG. 2, the material thickness of the welding mass 17 in the conical part of the welding electrode 4 is constant, and its height is preferably dimensioned to correspond to the thickness of the element 1 to be welded fast in each case. Thanks to this construction, certainty can be reached of the fact that the welding result will fullfill the present quality requirements, and the protecting cover 9 fastened permanently in advance need not be removed for inspection.

In order to reach certainty of the fact that the welding electrode will pass precisely into the opening 5 in the element 1 to be welded fast, the wall 11 of the protecting cover 9 is provided with a guide bushing 30 for the welding electrode 4, said bushing having a gasket for the sealed inlet of the welding electrode 4 into the interior 10 of the protecting cover 9.

Regarding the operation of the apparatus, it may further be stated that a diving apparatus or a diving robot will independently fetch the anodes to be fastened from a cage lowered in the water, said cage containing a large number of anodes, and bring them to be fastened to the work objects. All operations of the apparatus can be monitored by means of a monitor 107 fastened to the diving apparatus and provided with an illumination device 106. The diving apparatus may also be provided with an ultracamera checking also the quality of the welding done through the protecting cover 9, and thus it is possible for the monitoring persons, if necessary, to follow the fastening of each anode, as the apparatus is working under water.

It may further be stated that the necessary number of hydraulic pumps are provided in the diving apparatus 100, for working the lever arms of the welding apparatus as well as the hydraulic motor 103, and a source of welding current is also provided in the diving apparatus, from which source the welding current is conducted through the rotating means 25 to welding electrode 4. In this exemplary case, the source of welding current is earthed through the shears 22 to the element 1 to welded fast.

The invention has been described in the foregoing merely by means of some preferred embodiments thereof. This is by no means intended to limit the invention to relate merely to said exemplary cases, but, as is apparent to the man skilled in the art, the invention may be varied to substantial degree within the scope of the inventive concept defined in the appended claims. It will be specially emphasized that the welding apparatus does not presuppose the use of an unmanned diving appartus, but it can also be applied to a diver or to a manned diving carrier.

I claim:

1. An apparatus for forming an underwater weld joint between a support and an element to be welded onto a surface of the support comprising at least one protection cover disposed in tight relationship on a free surface of the element to be welded for insulating the support and the element to be welded from ambient water at least for the duration of a welding operation; at least one welding electrode, which rotates about its longitudinal axis and extends through a wall of the cover in sealed relationship to the wall of the cover; and drive means for conducting welding current to the welding electrode and for rotating and leading the welding electrode against edges of an opening in the element during welding, the drive means comprising hydraulically movable jaws for grasping a part of the welding electrode which protrudes from the protection cover, said drive means including rotating means for rotating the welding electrode during welding and for pushing the electrode against the edges of the opening in the element to be welded at a speed substantially corresponding to the consumption of the welding electrode.

2. An apparatus according to claim 1, characterized in that a head edge of the protection cover disposed against the element to be welded fast is furnished with a gasket.

3. An apparatus according to claim 1, characterized in that the protection cover is permanently fastened to the element to be welded fast.

4. An apparatus according to claim 1, characterized in that the interior of the protection cover is connected to a subatmospheric source through an outflow member in the wall of the protection cover.

5. An apparatus according to claim 3, characterized in that the wall of the protection cover is provided with a pressure valve outflow member opening at a predetermined pressure.

6. An apparatus according to claim 1, characterized in that the interior of the protection cover is filled with a filler material comprising polyurethane foam or welding flux.

7. An apparatus according to claim 1, characterized in that at least a part of the welding electrode within the interior of the protection cover is conically formed to taper towards the support.

8. An apparatus according to claim 1, characterized in that a guide bushing for the welding electrode is provided in the protection cover, said bushing having a gasket for the sealed inlet of the welding electrode.

9. An apparatus for forming an underwater weld joint between a support and an element to be welded onto a surface of the support comprising at least one protection cover disposed in tight relationship on a free surface of the element to be welded for insulating the support and the element to be welded from ambient water at least for the duration of a welding operation; at least one welding electrode, which rotates about its longitudinal axis and extends through a wall of the cover in sealed relationship to the wall of the cover; and drive means for conducting welding current to the welding electrode and for rotating and leading the welding electrode against edges of an opening in the element during welding, the drive means comprising gripping means for grasping a part of the welding electrode which protrudes from the protection cover as well as rotating means for rotating the welding electrode during welding and for pushing the electrode against the edges of the opening in the element to be welded at a speed substantially corresponding to the consumption of the welding electrode, and wherein the rotating means is a hydraulic motor furnished with a screw feeder for the welding electrode and with current-conducting carbons for conducting the welding current to said welding electrode.

* * * * *